US012229109B2

(12) United States Patent
Mohen et al.

(10) Patent No.: US 12,229,109 B2
(45) Date of Patent: Feb. 18, 2025

(54) METHOD AND SYSTEM FOR USING EXTERNAL CONTENT TYPE OBJECT TYPES

(71) Applicant: Open Text Corporation, Waterloo (CA)

(72) Inventors: Michael Mohen, Columbia, MD (US); Jeroen Mattijs van Rotterdam, Fort Lauderdale, FL (US); Satyapal P. Reddy, San Ramon, CA (US); David Humby, Richmond (CA)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 18/501,626

(22) Filed: Nov. 3, 2023

(65) Prior Publication Data

US 2024/0061825 A1 Feb. 22, 2024

Related U.S. Application Data

(63) Continuation of application No. 18/068,972, filed on Dec. 20, 2022, now Pat. No. 11,841,842, which is a continuation of application No. 16/405,201, filed on May 7, 2019, now Pat. No. 11,567,922, which is a continuation of application No. 14/755,000, filed on Jun. 30, 2015, now Pat. No. 10,324,921.

(51) Int. Cl.
*G06F 16/23* (2019.01)
*G06F 16/22* (2019.01)
*G06F 16/954* (2019.01)

(52) U.S. Cl.
CPC .......... *G06F 16/23* (2019.01); *G06F 16/2291* (2019.01); *G06F 16/954* (2019.01)

(58) Field of Classification Search
None
See application file for complete search history.

(56) References Cited

U.S. PATENT DOCUMENTS

| | | | |
|---|---|---|---|
| 10,324,921 B1 * | 6/2019 | Mohen | G06F 16/954 |
| 11,567,922 B2 * | 1/2023 | Mohen | G06F 16/2291 |
| 11,841,842 B2 * | 12/2023 | Mohen | G06F 16/23 |
| 2019/0258621 A1 * | 8/2019 | Mohen | G06F 16/23 |
| 2023/0127388 A1 * | 4/2023 | Mohen | G06F 16/954 |
| | | | 707/756 |
| 2024/0061825 A1 * | 2/2024 | Mohen | G06F 16/2291 |

* cited by examiner

*Primary Examiner* — Kim T Nguyen
(74) *Attorney, Agent, or Firm* — Sprinkle IP Law Group

(57) ABSTRACT

In general, embodiments of the technology relate to a method and system for implementing external content type (ECT) object types in a content management system (CMS). More specifically, embodiments of the technology relate to augmenting the object model with a new class of object type—an external content type (ECT) object type. The ECT object types are a class of object types that are used to manage object (referred to as managed external objects) that are located in external data systems.

20 Claims, 7 Drawing Sheets

METHOD AND SYSTEM FOR USING EXTERNAL CONTENT TYPE OBJECT TYPES

CROSS-REFERENCE TO RELATED APPLICATION(S)

This patent application is a continuation, and claims a benefit of priority under 35 U.S.C. § 120, of U.S. patent application Ser. No. 18/068,972, filed Dec. 20, 2022, issued as U.S. Pat. No. 11,841,842, entitled "METHOD AND SYSTEM FOR USING EXTERNAL CONTENT TYPE OBJECT TYPES," which is a continuation, and claims a benefit of priority under 35 U.S.C. § 120, of U.S. patent application Ser. No. 16/405,201, filed May 7, 2019, issued as U.S. Pat. No. 11,567,922, entitled "METHOD AND SYSTEM FOR USING EXTERNAL CONTENT TYPE OBJECT TYPES," which is a continuation of, and claims a benefit of priority under 35 U.S.C. § 120, of U.S. patent application Ser. No. 14/755,000, filed Jun. 30, 2015, issued as U.S. Pat. No. 10,324,921, entitled "METHOD AND SYSTEM FOR USING EXTERNAL CONTENT TYPE OBJECT TYPES," both of which are fully incorporated by reference herein.

BACKGROUND

Significant amounts of content are stored in content repositories. The access and manipulation of this content is typically limited to pre-defined constructs and/or methods. When attempts are made to modify the pre-defined constructs and/or methods, such attempts require significant resources and time to implement.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for implementing external content type (ECT) object types in a content management system (CMS). More specifically, embodiments of the technology relate to augmenting the object model with a new class of object type—an external content type (ECT) object type. The ECT object types are a class of object types that are used to manage object (referred to as managed external objects) that are located in external data systems. The ECT object types, embodiments of which are described below, may enable users of the content management system to manage external objects (i.e., objects that are not stored in content repositories managed by the CMS) in the same manner that they manage objects stored in the CMS.

Figure 1:
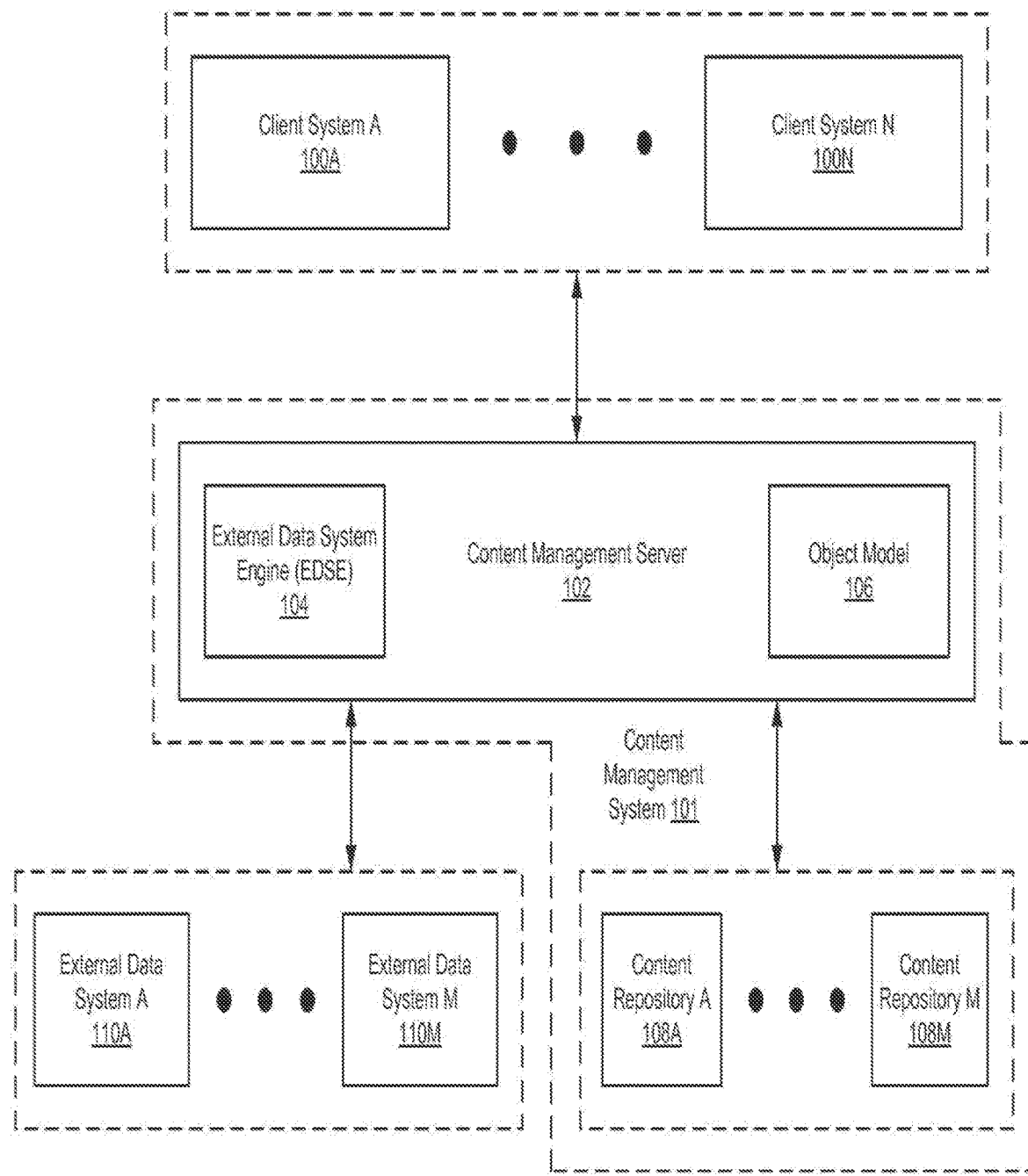
FIG. 1 shows an exemplary system in accordance with one or more embodiments of the technology.

FIG. 1 shows an exemplary system in accordance with one or more embodiments of the technology. The system includes one or more client systems (100A, 100N), one or more external data systems (110A, 110M), and a content management system (101), which includes a content management server (102) and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 6) that includes functionality to issue a request(s) to the content management server (102) and to receive a corresponding response(s) from the content management server after the request has been serviced.

In one embodiment of the technology, each client system may be referred to as a platform, where the platform includes the combination of hardware and software (including the operating system, virtual machines, etc. but excluding applications) executing on the hardware. Each client system may also include one or more applications, where the applications are executing on the platform. In one embodiment of the technology, each platform and/or application may be characterized as public (e.g., the platform is operating on a public computing network or is a publicly accessible computing system) or private (e.g., the platform is operating on a private computing network (e.g., an internal company network) or is a computing system that is provisioned by a company (or another legal entity) for use by the company's employee). Additionally, or alternatively, the platform and/or application may also be characterized based on the level of security measures (e.g., encryption, multi-factor authentication, secure communication protocols, etc.) implemented in the platform and/or application (e.g., a rating scale of 1-5 may be used where 1 is unsecure and 5 is the highest level of security). Each platform and/or application may be characterized using other characterization schemes without departing from the technology. Further, each platform and/or application may be characterized using a combination of characterization schemes (e.g., a platform may be characterized as private, level 3 security).

Figure 4:
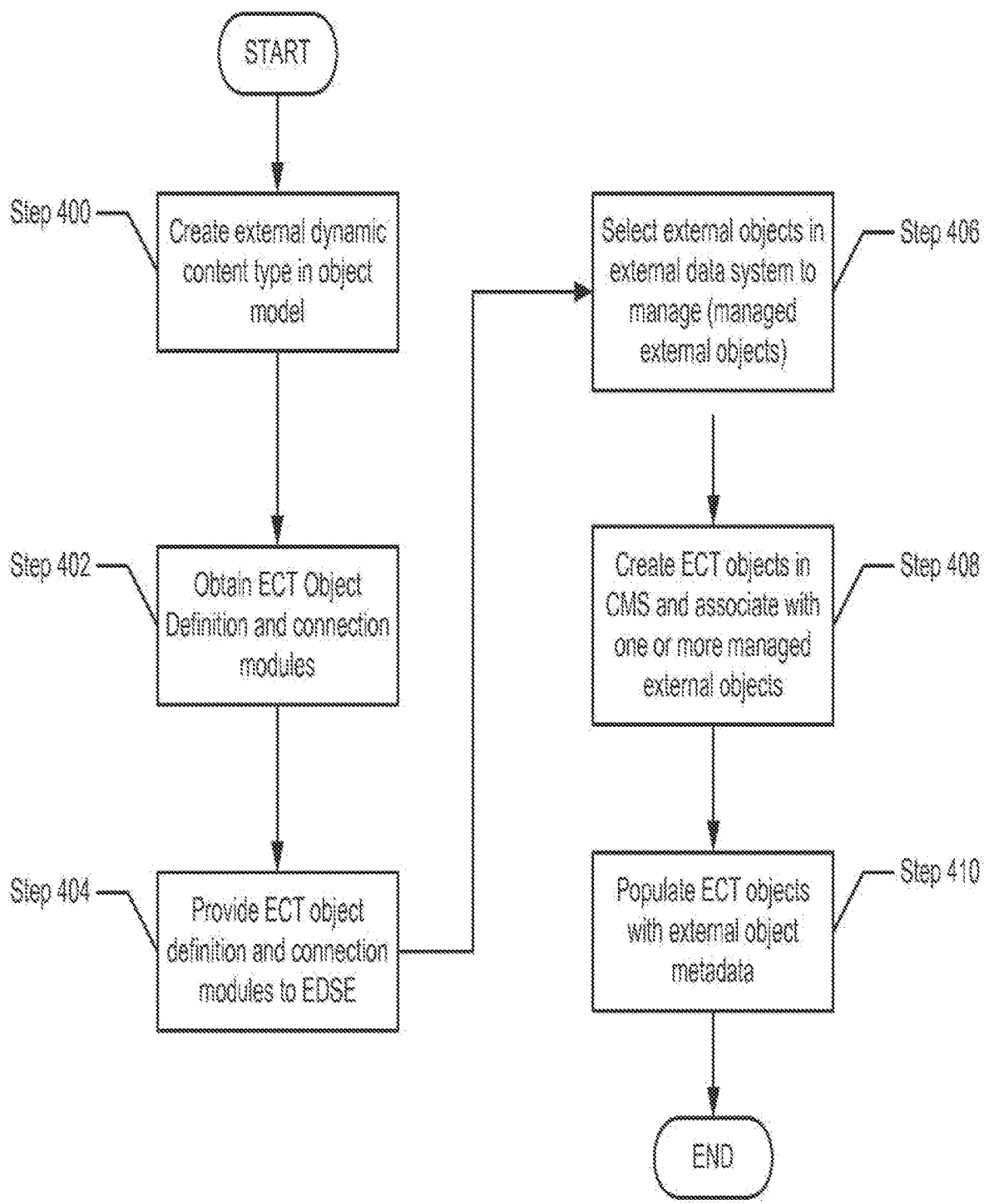
FIG. 4 shows a method for configuring a system to use an external content type in accordance with one or more embodiments of the technology.

Continuing with the discussion of FIG. 1, the content management server includes functionality to perform the method shown in FIG. 4. Further, the content management server may include functionality to receive requests from one or more client systems and to service such requests using the external data system engine (EDSE) (104) and the object model (106). The content management server may also include functionality to perform various actions (e.g., read, write, delete, modify, etc.) on the objects and ECT objects stored in the content repositories when servicing requests from the client systems (see e.g., FIG. 5).

Figure 3:
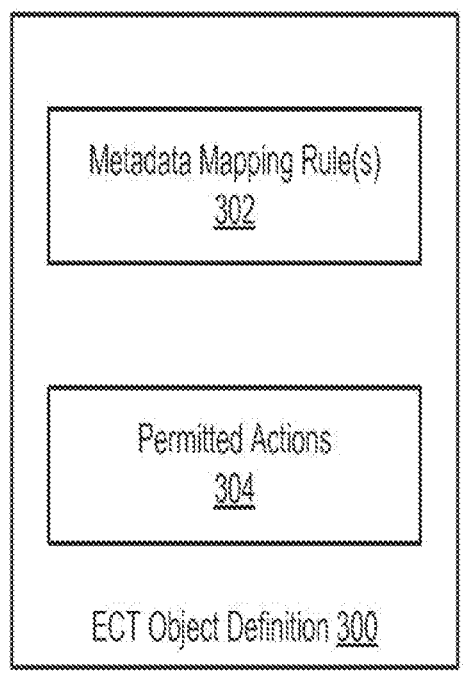
FIG. 3 shows an exemplary external content type (ECT) object definition in accordance with one or more embodiments of the technology.
Figure 5:
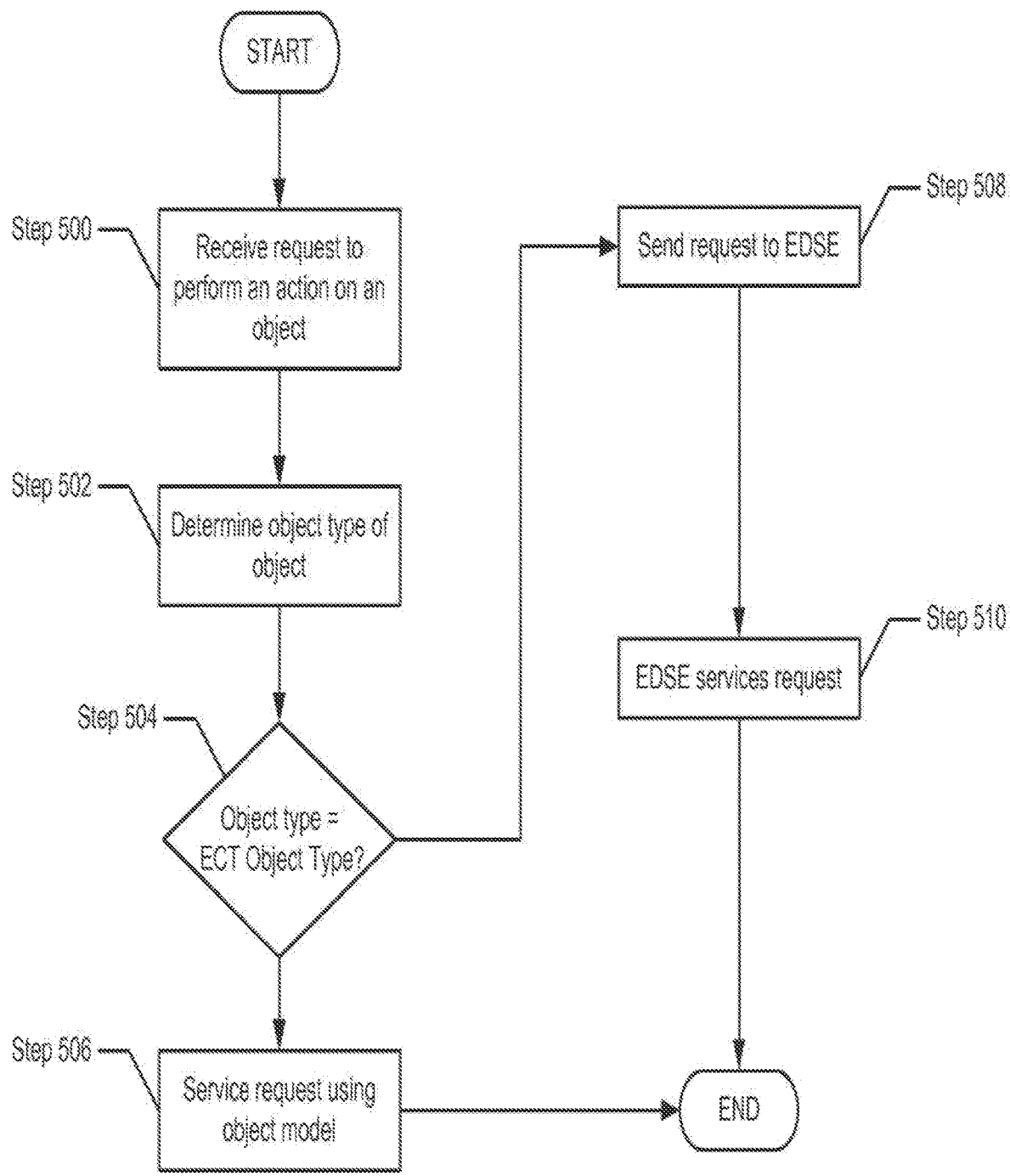
FIG. 5 shows a method for servicing requests in accordance with one or more embodiments of the technology.

In one embodiment of the technology, the EDSE (104) includes functionality to service requests on ECT objects (i.e., objects that have an object type that is designated as an ECT object type) at least in part, using the ECT object definition (see e.g., FIGS. 3 and 5). Further, the EDSE (104) includes functionality to communicate with the various external data systems in order to perform the methods described in FIGS. 4 and 5 using connection modules.

In one embodiment of the technology, the object model (106) specifies the object types that are supported by the content management system and how the content management system is to interact with such objects (based on their object type). With respect to the ECT objects, the object model may specify that the content management system supports various ECT object types and may also specify that the processing of objects with an object type that is designated as an ECT object type is determined, at least in part, by the EDSE.

In one embodiment of the technology, the content management system includes functionality to determine, obtain, and/or store the characterization of the platforms and/or applications with which it is interacting. Such information may then be used to perform at least the functionality described in FIG. 5.

Figure 6:
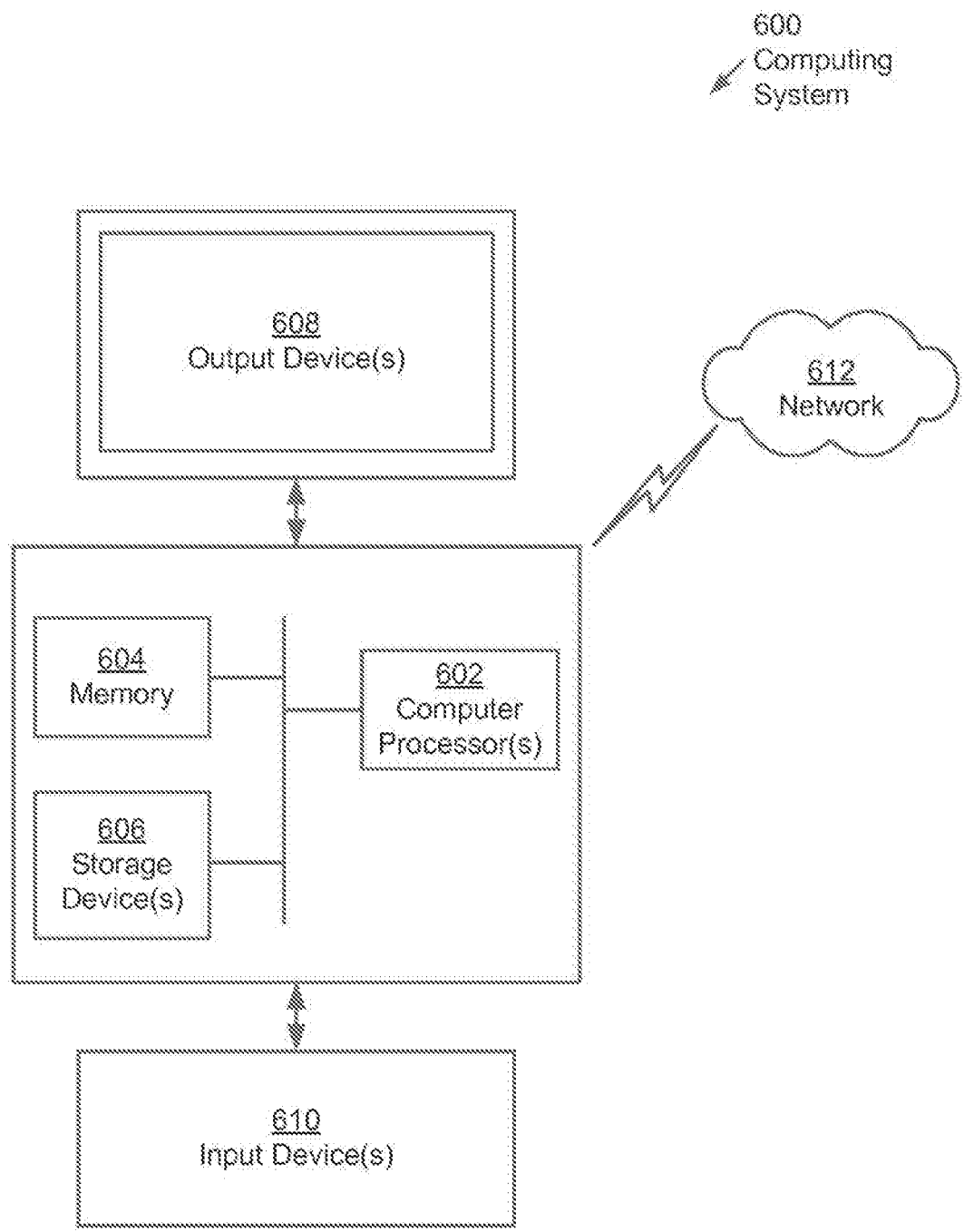
FIG. 6 shows a computing system in accordance with one or more embodiments of the technology.

The content management server may be implemented using one or more computing systems (see e.g., FIG. 6). Additional detail about the operation of the content management server is provided in FIGS. 4 and 5.

In one embodiment of the technology, each content repository (108A, 108M) includes persistent storage (e.g., solid state storage, magnetic storage, optical storage, any other type of persistent storage or any combination thereof) in which objects (see e.g., FIG. 2A) and ECT objects (see e.g., FIG. 2B) are stored.

Continuing with the discussion of the content repositories, each of the content repositories may store objects and ECT objects using any known or subsequently discovered mechanism. The following describes various examples of the mechanisms that may be used to store objects and ECT objects. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

In one embodiment of the technology, an external data system (EDS) (110A, 110M) corresponds to any 3rd party computing system (see e.g., FIG. 6) that includes functionality to store content and manage the stored content (e.g., service requests to create, read, write, delete, and/or modify content). With respect to the content, the content may correspond to any type of data that may be stored in the content repository. Examples of content may include, but are not limited to, text files, audio files, image files, and/or audio-visual files. Continuing with the discussion of FIG. 1, each EDS may include functionality to: (i) receive requests from the content management system; and (ii) service the requests from the content management system. The content stored in and managed by the external data sources may be referred to as external objects. Further, when an external object is associated with an ECT object (see e.g., FIGS. 2B and 4), then the external object may be referred to as a managed external object.

The technology is not limited to the architecture of the system shown in FIG. 1.

In one or more embodiments of the technology, the content repositories store two classes of objects-objects (i.e., objects not designated as ECT objects and also referred to as non-ECT objects) and ECT objects (i.e., objects that have an object type that is an ECT object type). As discussed above, the content management server (102) includes functionality to interact with any number of external data systems (110A, 110N). For each external data system (110A, 110N) (or set of external data systems), there may be one ECT object type. Accordingly, if there are three external data systems, then the object model may include three ECT object types (e.g., ECT object type 1, ECT object type 2, and ECT object type 3) Each ECT object type is defined using an ECT type definition (see FIG. 3).

Additional details about the information stored in objects and ECT object is described below in FIGS. 2A and 2B, respectively.

Figure 2A:
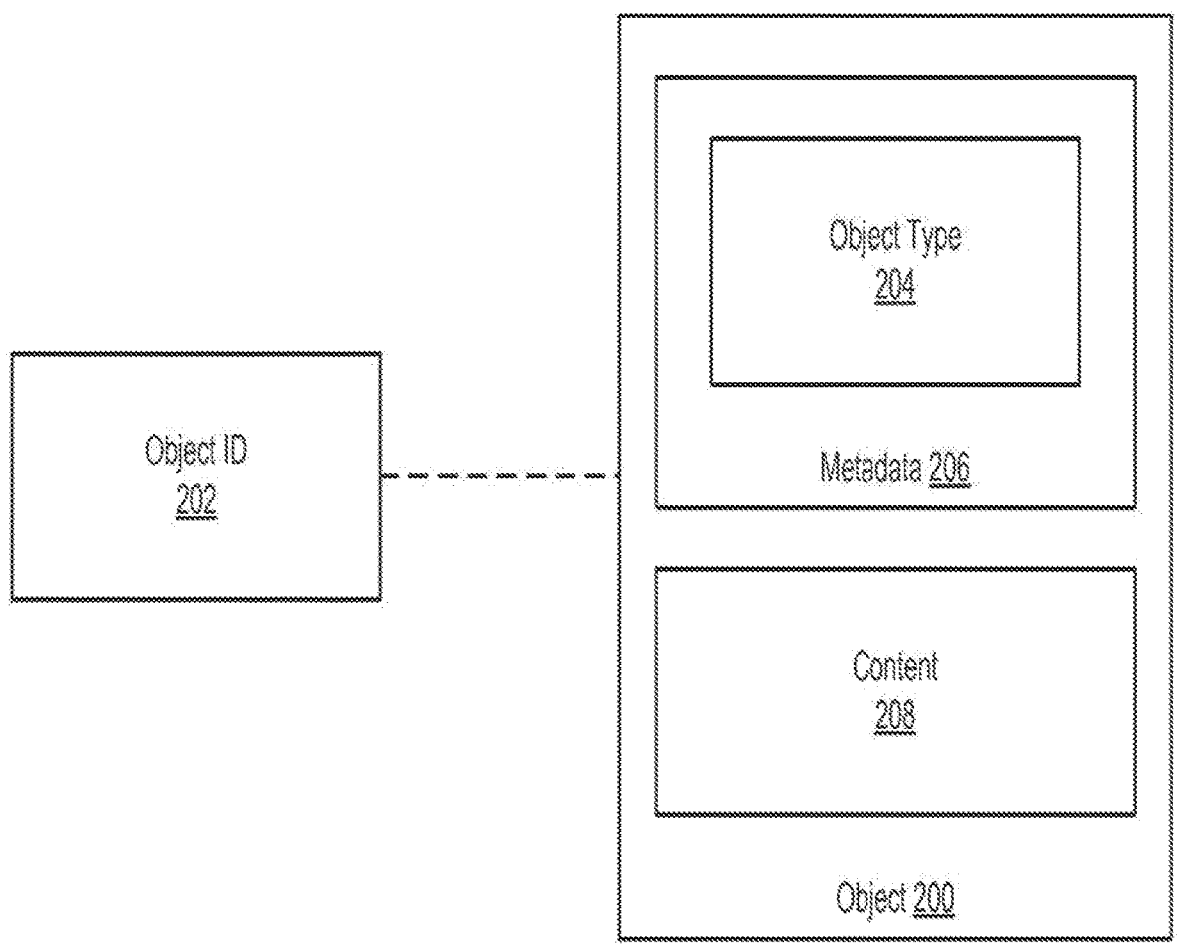
FIG. 2A shows an exemplary object in accordance with one or more embodiments of the technology.

FIG. 2A shows an exemplary object (also referred to as non-ECT object) in accordance with one or more embodiments of the technology. The object (200) corresponds to a combination of content (208) and the metadata (206) associated with the content. The metadata (206) may include the object type (204) as well as any other metadata associated with the object. Examples of metadata may include, but are not limited to, author, content name, creation time, creation date, size of object, modification time, modification date, object format (i.e., the format of the content (208), e.g., portable document format (PDF), MPEG-4, .txt., etc.). With respect to the content, the content may correspond to any type of data that may be stored in the content repository. Examples of content may include, but are not limited to, text files, audio files, image files, and/or audio-visual files.

In one embodiment of the technology, each object (200) may be identified using an object ID (202). The object ID uniquely identifies the object in the content repository. The object ID may be any combination of numbers, letters, and symbols.

In one embodiment of the technology, the metadata and content associated with a given object may be stored in a single location in a content repository. Alternatively, the metadata associated with an object may be stored in a first location and the content associated with a given object may be stored in a second location, where the first and second locations may be in the same or different content repositories.

Figure 2B:
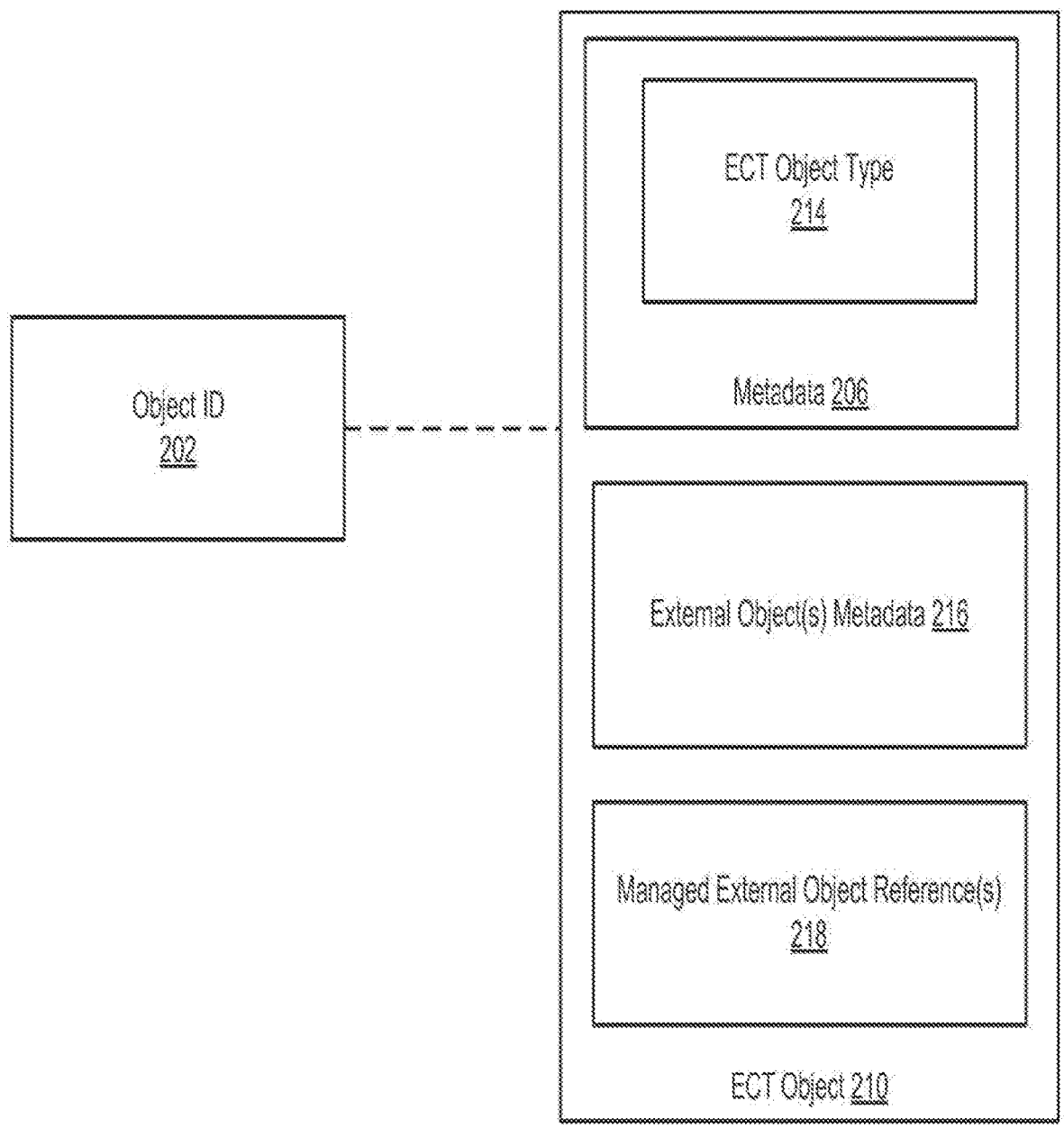
FIG. 2B shows an exemplary external content type (ECT) object in accordance with one or more embodiments of the technology.

FIG. 2B shows an exemplary ECT object in accordance with one or more embodiments of the technology. The ECT object (210) corresponds to a combination of the metadata (206) associated with the ECT object, external object metadata (216) for one or more managed external objects, and one or more managed external object references.

The metadata (206) in each ECT object includes an ECT object type (214). The ECT object type may correspond to an object type that is specific to a single external data system or that is specific to a certain combination of external data systems.

The external object metadata (216) includes metadata (or a portion thereof) from each of the managed external objects that are associated with the ECT object. The specific information that is included in the external object metadata (which may include similar types of information as metadata (206) (described in FIG. 2A) may be determined by the ECT object definition (see FIG. 3).

In one embodiment of the technology, the ECT object includes a managed external object reference (218) for each of the managed external objects. The managed external object reference (218) corresponds to an identifier that is used by the external data system in which the managed external object is stored.

In one embodiment of the technology, each ECT object (210) may be identified using an object ID (202). The object ID uniquely identifies the ECT object in the content repository. The object ID may be any combination of numbers, letters, and symbols.

In one embodiment of the technology, while the information stored in the object (200) and the ECT object (210) is different, from the perspective of the client systems (100A, 100N), the ECT object (210) appears to be the same as the object (200).

Though not shown in FIG. 2B, the ECT object may also include content (208). Said another way, the ECT object may be associated with any number of managed external objects also be associated with content that is stored within the content management system (101).

FIG. 3 shows an exemplary ECT object definition in accordance with one or more embodiments of the technology. Each ECT object definition (300) includes metadata mapping rules (302) and specifies permitted actions (304).

In one embodiment of the technology, the metadata mapping rules (304) specify which portions of the metadata that is stored for the managed external objects in the external data system may be stored in the corresponding ECT objects in the content repository. Further, the metadata mapping rules (304) may specify how the aforementioned metadata is maintained in the ECT object. For example, a managed external object may include the following metadata: name, creation date, size, and file path. Per the metadata mapping rules, only the name and creation date are permitted to be stored in the corresponding ECT object in the content repository. The metadata mapping rules may also specify any transformations (e.g., redaction, modification, etc.) on the metadata that may need to be performed before the external content metadata (216) is stored in the ECT object.

In one embodiment of the technology, the ECT object definition may specify permitted actions (304). The permitted actions (304) correspond to actions that may be performed on a managed external object (i.e., the external object that is associated with the ECT object). The permitted actions may be specified in terms of actions that may be performed on external object metadata and actions that may be performed on the content of the managed external object. The permitted actions may include modification of all or a portion of the metadata and/or content of the managed external objects. For example, the permitted actions may specify that the content of a managed external object may be viewed but that all social security numbers in the aforementioned content must be redacted prior to such content being provided to the client system.

Continuing with the discussion of FIG. 2B, additionally, or alternatively, the permitted actions may also be specified in accordance context (i.e., an action may be performed based on the content associated with the action).

In one embodiment of the technology, the context may be specified at any level of granularity. For example, the context may specify one or more of the following: (i) the object, e.g., using the object ID or using an expression (e.g., a regular expression) that may be used to identify the object (e.g., if content in the object is an audio-visual file); (ii) the action (or set of actions); (iii) a characterization associated with the source platform (i.e., the platform from which a request was issued (see e.g., FIG. 5, step 500)); (iv) a characterization associated with the source application (i.e., the application from which a request was issued (see e.g., FIG. 5, step 500)); (v) the user that issued the request; (vi) a characterization associated with a target platform (i.e., the platform on which the object will be viewed if the request is successfully serviced); (vii) source content repository (i.e., the content repository in which the object is currently stored); and (viii) target content repository (i.e., the content repository in which the object will be stored if the request is successfully serviced). The context may specify additional and/or other information without departing from the technology.

The ECT object definition may specify additional or other information without departing from the technology.

FIGS. 4 and 5 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

Turning to FIG. 4, FIG. 4 shows a method for configuring a system to use dynamic content types in accordance with one or more embodiments of the technology.

In step 400, ECT object type is created within the object model. The creation of the specific ECT object type in step 400 may also include updating a data structure in (or by) the content management server, which tracks which object types in the object model are ECT object types. Alternatively, the content management server may use another mechanism to track that the object type created in step 400 in an ECT object type.

In step 402, the ECT object definition for the ECT object type (see e.g., FIG. 3) and connection modules for the ECT object type created in step 400 are obtained. In one embodiment of the technology, the connection module(s) correspond to code that may be executed by the external data system engine in order to issue appropriate requests to the external data system and to process responses from the external data system. The connection module(s) may also include functionality to translate the action (i.e., the action specified in the request in FIG. 5, 500) into an equivalent action/command that may be processed by the external data system. In one embodiment of the technology, if the ECT objects for the ECT object type are each associated with multiple managed external objects in different external data systems, then the appropriate connection modules for each of the aforementioned external data systems in obtained.

In step 404, the ECT object definition and the connection modules are provided to (or made accessible to) the external system data engine.

In step 406, one or more external objects in an external data system(s) are selected (or identified) as external objects that are to be managed by the content management system.

In step 408, ECT objects are created for each of the identified external objects in step 406. In another embodiment of the technology, an ECT object may be created for a set of external objects (i.e., a single ECT object may be used to represent a set of external objects in the same or different external data systems). The ECT objects, after step 408, may each be associated with an object ID (FIG. 2, 202) that is generated by the content management system. Further, each of the ECT objects may include one or more managed external object references (i.e., external object references for each of the external objects that are associated with the ECT object).

In step 410, external object metadata (or portions thereof) for each of the objects identified in step 406 is obtained from the appropriate external data system and stored in the corresponding ECT object. The specific external object metadata that is stored in the ECT object is determined, at least in part, using the metadata mapping rules. In one embodiment of the technology, the external object metadata is obtained from the external data system(s) by the external data system engine using one or more connection modules.

Those skilled in the art will appreciate that other methods may be used for creating and populating the ECT objects in the content repository without departing from the technology. For example, the ECT objects may be created and populated using batching processing. This example is not intended to limit the technology.

FIG. 5 shows a method for servicing requests in accordance with one or more embodiments of the technology.

In step 500, a request is received by the content management system from a requesting entity (e.g., a client system). In one embodiment of the technology, the request includes an object ID and an action(s) to be performed on (or with) the object (or a portion thereof) associated with the object ID. The request may include additional information (e.g., parameters associated with the action) without departing from the technology. The action may correspond to any action that may be performed on any portion of an object. Examples of actions may include, but are not limited to, read, write, modify, delete, and move. In one embodiment of the technology, the request may include specifying a set of objects using, e.g., object IDs or a regular expression. The object specified (via an object ID or a regular expression) may be a non-ECT object (see e.g., FIG. 2A) or an ECT object (see e.g., FIG. 2B); however, from the perspective of the client system all objects in the content repository appear to be non-ECT objects, where the content of such objects is stored in a content repository (as opposed to in an external data system).

In one embodiment of the technology, the action may be initiated by a process executing in the content management system instead of from a client system (see e.g., Example 2 below).

In the event that the request specifies multiple objects and/or multiple actions, steps 502-510 may be performed for every <object ID, action> pair.

In step 502, the object type for the object (i.e., the object corresponding to the object ID) is obtained. In one embodiment of the technology, step 502 may include querying the content repository to locate the object corresponding to the object ID and then obtaining the metadata (including the object type) from the content repository.

In step 504, a determination is made about whether the object type for the object is an ECT object type. The determination is step 504 may be made using a data structure in (or by) the content management service, which tracks which object types in the object model are ECT object types. If the object type for the object is an ECT object type, then the process proceeds to step 508; otherwise, the process proceeds to step 506.

In step 506, a request which specifies an object that has an object type that is a non-ECT object type is processed by the content management system in accordance with the object model. Said another way, the request is serviced without invoking the External Data System Engine or any of the ECT object definitions. The result(s) generated by servicing the request is sent to the requesting entity (i.e., the entity that issued the request in step 500).

Returning to step 504, if the object type for the object is an ECT object type, then the process proceeds to step 508. In step 508, the request is sent to the External Data System Engine (EDSE) to be serviced.

In step 508, the request is serviced using the EDSE. In one embodiment of the technology, servicing the request may include: (i) obtaining the ECT object definition using the ECT object type (i.e., the object type specified in the ECT object); (ii) determining, based on the permitted actions specified in the ECT object definition, whether the requested action is permitted; (iii) if the action is not permitted, an appropriate response is generated by the EDSE and sent to the requesting entity; (iv) if action is permitted, then the action is subsequently performed.

In one embodiment of the technology, performing the action may include: (i) generating and issuing, by the EDSE, a request to the appropriate EDS, where the request includes the managed external object reference and an action from the request in step 500 (or an EDS action that corresponds to the action specified in step 500, where the EDS includes functionality to perform the EDS action); (ii) receiving a response from the EDS that the action was successfully or unsuccessfully performed on the content and/or the metadata of the managed external object in the EDS; (iii) updating, as appropriate, the external object metadata in the ECT object (i.e., the object identified in step 500); and (iv) sending a response (indicating that the action was successfully or unsuccessfully performed) to the requesting entity. With respect to (i) above, the EDSE may use ECT object type (or other information) to identify the appropriate connection modules to enable the EDSE to interact with the external data system in order to service the request. Further, the aforementioned connection module may include functionality to generate an EDS action(s), i.e., command that corresponds to the action in the request in step 500, that can be processed by the external data system.

In another embodiment of the technology, performing the action may include: (i) generating and issuing, by the EDSE using the connection module, a request to the appropriate EDS for the managed external object, where the request includes the managed external object reference; (ii) receiving, by the EDSE, the managed external object; (iii) performing, by the EDSE, the action on the obtained managed external object (e.g., on all or portion of its metadata or content) to generate an updated managed external object; (iv) transmitting, using a connection module, the updated managed external object back to the EDS; (v) updating, as appropriate, the external object metadata in the ECT object (i.e., the object identified in step 500); and (vi) sending a response (indicating that the action was successfully or unsuccessfully performed) to the requesting entity.

In another embodiment of the technology, the action may include: (i) generating and issuing, by the EDSE using the connection module, an request to the appropriate EDS for the managed external object, where the request includes the managed external object reference; (ii) receiving, by the EDSE, the managed external object; (iii) selecting the portions of the managed external object (i.e., the portions of the content and/or metadata of the managed external object) to provide the requesting entity; (iv) optionally, modifying, as specified in the permitted actions, all or some of the portions of the managed external object determined in (iii); and (vi) sending a response that includes the portions of the managed external object (which may have been modified) to the requesting entity.

In one embodiment of the technology, if the ECT object included content (FIG. 2, 208) and the action specified in step 500 is to be performed on this content, then the request may be serviced in accordance with step 506 instead of in accordance with step 510.

The following section describes examples in accordance with one or more embodiments of the technology. The examples are not intended to limit the scope of the technology.

Example 1

Consider a scenario in which a company has the following three systems: (i): EDS 1—a credit report management system that includes credit reports; (ii) EDS 2—a scanned documented management system that maintains scanned copies of all executed loan documents; and (iii) a content management system that includes loan record objects. The company would like to architect its systems such that a client system can access all of the content from the three systems via the content management system. In this example, the content management system may be implemented, using one or more embodiments of the technology as described below.

Specifically, a first ECT object type (ECT Object Type 1) is created for EDS 1 in the object model that is associated with a first ECT object definition and a second ECT object type (ECT Object Type 2) is created for EDS 2 in the object model that is associated with a second ECT object definition. Further, appropriate connection modules are obtained to enable the content management system (or, more specifically, the external data system engine) to communicate with EDS 1 and EDS 2.

Once the object model has been updated with the two additional ECT object types, EDS 1 is analyzed to determine which credit reports are to be made accessible to the client systems. For each of the identified credit reports, an ECT object of ECT object type 1 is created in the content repository within the content management system, where each of these ECT objects includes: (i) an object ID assigned by the content management system, (ii) a managed external object reference for the credit report (which was assigned to the credit report by EDS 1), and (iii) metadata for the credit report obtained from the EDS 1 (i.e., external object metadata).

Similarly, EDS 2 is analyzed to determine which scanned loan documents are to be made accessible to the client systems. For each of the identified scanned loan documents an ECT object of ECT object type 2 is created in the content repository within the content management system, where each of these ECT objects includes: (i) an object ID assigned by the content management system, (ii) a managed external object reference for the scanned document (which was assigned to the scanned loan documents by EDS 2), and (iii) metadata for the scanned loan documents obtained from the EDS 2 (i.e., external object metadata).

Once the aforementioned ECT objects have been created and populated in the content management system, the client systems may interact with the ECT objects as if the underlying content for the ECT objects is present in the content management system. Said another way, the client systems may interact with the ECT objects in the same manner that the client systems may interact with non-ECT objects (e.g., the loan application records) in the content management system.

Example 2—Document Retention

Consider a scenario in which a company includes a legacy email system that is used to archive emails and the legacy email system does not include any mechanism to implement document retention policies. The company would like to implement a document retention policy on its email messages, where the email messages are to be deleted after five years from creation date of the email. In one or more embodiments of the technology, the company implements a content management system (see e.g., FIG. 1).

An ECT object type (ECT Object Type 1) is created for the legal email system (i.e., EDS 1) in the object model that is associated with an ECT object definition. Further, appropriate connection modules are obtained to enable the content management system (or, more specifically, the external data system engine) to communicate with EDS 1.

Once the object model has been updated with the additional ECT object type, EDS 1 is analyzed to determine which email messages are to be managed by the content management system. For each of the identified email messages, an ECT object of ECT object type 1 is created in the content repository within the content management system, where each of these ECT objects includes: (i) an object ID assigned by the content management system, (ii) a managed external object reference for the email message (which was assigned to the email message by EDS 1), and (iii) metadata for the email message obtained from the EDS 1 (i.e., external object metadata). In this example, the external object metadata may only include the creation date of the email and no other external object metadata is required by the content manage system to implement the retention policy.

The content management system may then implement the retention policy on the ECT objects. More specifically, the content management system may track how long an email message has been stored in email system based on the external object metadata stored in the ECT objects in the content repository. Once the content management system determines that five years have elapsed, the content management system initiates the deletion of the ECT object. In response to the deletion action by the content management system, the content management system: (i) initiates the deletion of the corresponding email message on the email system (via the external data system engine and the appropriate connection module(s)) and (ii) deletes the ECT object from the content repository.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests, the method comprising:
   receiving, by a content management server from a requesting entity, a first request to perform an action on a first object that is stored in a content repository coupled to the content management server;
   identifying, in metadata of the first object, an external control type (ECT) object type; and
   in response to identifying the ECT object type in the metadata of the first object, invoking an External Data System Engine (EDSE) that services the first request by:
      obtaining an ECT object definition using the identified ECT object type;
      determining, based on permitted actions specified in the obtained ECT object definition, whether the requested action is permitted;
      in response to determining that the action is not permitted by the ECT object definition, sending a corresponding response to the requesting entity; and
      in response to determining that the action is permitted by the ECT object definition, performing the action on a managed external object referenced by the first object, the managed external object located in an external data system that is external to a system hosting the content repository.

2. The method of claim 1,
   further comprising:
      receiving, from a second requesting entity, a second request to perform the action on a second object;
      making a second determination that an object type of the second object is a non-ECT object type; and
      based on the second determination, servicing the second request using an object model without invoking the EDSE.

3. The method of claim 1, wherein the first object comprises metadata, external object metadata for a first managed external object, external object metadata for a second managed external object, a first managed external object reference, and a second managed external object reference.

4. The method of claim 1, wherein servicing the first request comprises:
   obtaining content from the external data system using a managed external object reference in the first object;
   modifying the content in accordance with the action to obtain modified content; and
   providing the modified content to the external data system.

5. The method of claim 4, wherein servicing the first request further comprises:
   sending a request to the external data system to perform the action, wherein the request comprises a managed external object reference;
   receiving, in response to the request, a confirmation that the action was performed by the external data system; and
   updating at least a portion of external object metadata in the first object based on the confirmation.

6. The method of claim 1, wherein servicing the first request comprises:
   making a second determination, using the ECT object definition, that the action is permitted;
   based on the second determination, using at least one connection module, to perform the action on the managed external object associated with the first object;
   transmitting, using the at least one connection module, an updated managed external object back to an External Data System (EDS); and
   updating an external object metadata in the ECT object.

7. The method of claim 1, wherein servicing the first request comprises:
   obtaining a context of the first request;
   obtaining content from the external data system using a managed external object reference in the first object; and performing the action, based at least in part on the context, on the content.

8. The method of claim 1, wherein servicing the first request comprises:
   generating, using at least one connection module, a request to an External Data System (EDS), the request including a managed external object reference;
   receiving, by the EDSE, the managed external object;
   selecting at least a portion of the managed external object;
   modifying the at least the portion of the managed external object; and
   sending a response that includes the at least the portion of the managed external object to a requesting entity.

9. The method of claim 1, wherein the ECT object type enables users of the content management server to manage a plurality of managed external objects stored in external repositories that are not managed by the content management server, in a same manner as the users manage local objects, that are not ECT objects, stored in the content repository that is coupled to the content management server.

10. A non-transitory computer readable medium storing computer readable program code, which when executed by a computer processor of a content management server enables the computer processor to perform a method for servicing requests, the method comprising:
   receiving, from a requesting entity, a first request to perform an action on a first object that is stored in a content repository coupled to the content management server;
   identifying, in metadata of the first object, an external control type (ECT) object type; and
   in response to identifying the ECT object type in the metadata of the first object, invoking an External Data System Engine (EDSE) that services the first request by:
      obtaining an ECT object definition using the identified ECT object type;
      determining, based on permitted actions specified in the obtained ECT object definition, whether the requested action is permitted;
      in response to determining that the action is not permitted by the ECT object definition, sending a corresponding response to the requesting entity; and
      in response to determining that the action is permitted by the ECT object definition, performing the action on a managed external object referenced by the first object.

11. The non-transitory computer readable medium of claim 10, the method further comprising:
   receiving, from a second requesting entity, a second request to perform the action on a second object;
   making a second determination that an object type of the second object is a non-ECT object type; and
   based on the second determination, servicing the second request using an object model without invoking the EDSE.

12. The non-transitory computer readable medium of claim 10, wherein the first object comprises metadata, external object metadata for the managed external object, and a managed external object reference for the managed external object.

13. The non-transitory computer readable medium of claim 10, wherein servicing the first request comprises:
   sending a request to the external data system to perform the action, wherein the request comprises a managed external object reference; and
   receiving, in response to the request, a confirmation that the action was performed by the external data system.

14. The non-transitory computer readable medium of claim 10, wherein servicing the first request comprises:
   generating, using at least one connection module, a request to an External Data System (EDS), the request including a managed external object reference;
   receiving, by the EDSE, the managed external object;
   selecting at least a portion of the managed external object;
   modifying the at least the portion of the managed external object; and
   sending a response that includes the at least the portion of the managed external object to a requesting entity.

15. The non-transitory computer readable medium of claim 10, wherein servicing the first request comprises:
   making a second determination, using the ECT object definition, that the action is permitted;
   based on the second determination, using at least one connection module, to perform the action on the managed external object associated with the first object;
   transmitting, using the at least one connection module, an updated managed external object back to an External Data System (EDS); and
   updating an external object metadata in the ECT object.

16. A system, comprising:
   a content repository storing a first object and a second object;
   a content management server coupled to the content repository and programmed to:
      receive, from a requesting entity, a first request to perform an action on the first object;
      identify, in metadata of the first object, an external control type (ECT) object type; and
      in response to identifying the ECT object type in the metadata of the first object, invoke an External Data System Engine (EDSE) that services the first request by:
         obtaining an ECT object definition using the identified ECT object type;
         determining, based on permitted actions specified in the obtained ECT object definition, whether the requested action is permitted;
         in response to determining that the action is not permitted by the ECT object definition, sends a corresponding response to the requesting entity; and
         in response to determining that the action is permitted by the ECT object definition, performing the action on a managed external object referenced by the first object, the managed external object located in an external data system that is external to a system hosting the content repository.

17. The system of claim 16, wherein the content management server is further programmed to:
   receive, from a second requesting entity, a second request to perform the action on a second object;
   make a second determination that an object type of the second object is a non-ECT object type; and
   based on the second determination, service the second request using an object model without invoking the EDSE.

18. The system of claim 16, wherein the first object comprises metadata, external object metadata for the managed external object, and a managed external object reference for the managed external object.

19. The system of claim 16, wherein servicing the first request comprises:

sending a request to the external data system to perform the action, wherein the request comprises a managed external object reference; and receiving, in response to the request, a confirmation that the action was performed by the external data system.

20. The system of claim 16, wherein servicing the first request comprises:

receiving, from a second requesting entity, a second request to perform the action on a second object;

making a second determination that an object type of the second object is a non-ECT object type; and based on the second determination, servicing the second request using an object model without invoking the EDSE.

* * * * *